(No Model.)

J. DORSCH & G. LINDNER.
FOOD STRAINER AND STEAMER.

No. 261,142. Patented July 18, 1882.

Witnesses:
E. G. Asmus
O. R. Erwin

Inventor:
John Dorsch
Georg Lindner
By Jas. R. Erwin
Attorney.

UNITED STATES PATENT OFFICE.

JOHN DORSCH AND GEORGE LINDNER, OF CANANDAIGUA, NEW YORK.

FOOD STRAINER AND STEAMER.

SPECIFICATION forming part of Letters Patent No. 261,142, dated July 18, 1882.

Application filed April 3, 1882. (No model.)

*To all whom it may concern:*

Be it known that we, JOHN DORSCH and GEORGE LINDNER, citizens of the United States, residing at Canandaigua, in the county of Ontario and State of New York, have invented certain new and useful Improvements in Vessels for Straining and Steaming Food; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to improvements in food strainers or steamers.

The object of our improvements is to provide a device by which a strainer or steamer of a given size is adapted to be used with various-sized kettles without permitting the steam to escape around them, which device will support the strainer or steamer at a uniform depth in all kettles without regard to their height or to slight variations in their diameters, and also by which the strainer or steamer is retained loosely in the kettle without coming in contact with its sides, thereby preventing the strainer from becoming fastened in the kettle, while the handle and upper part of the vessel are supported above the kettle, where the handle is readily reached.

Figure 1:
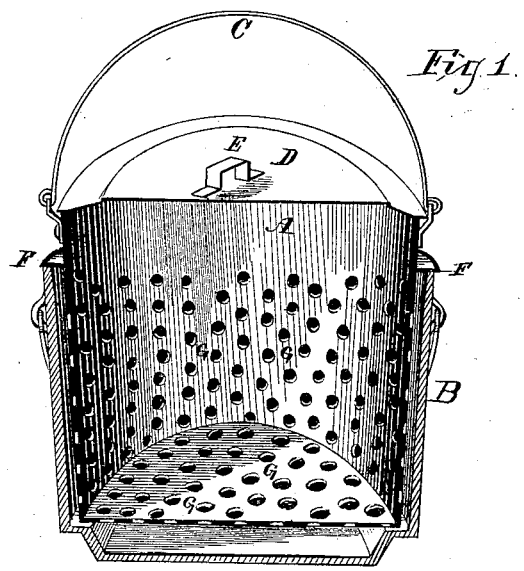
Figure 2:
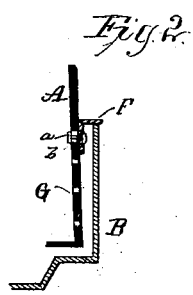

Our invention is further explained by reference to the accompanying drawings, Figure 1 of which represents a vertical section of the same in perspective. Fig. 2 is a detailed view in section.

A is the strainer. B is the kettle. C is the handle of the strainer. D is the cover. F is a supporting-flange. G are perforations or steam-passages.

When the vessel is used as a strainer the flange F is located near the top of the same, whereby the bottom of the strainer and its contents may be submerged beneath the water in the kettle. When the kettle is used as a steamer the flange F is located near the bottom of the vessel, whereby the same is supported above the water. The perforations G are all formed beneath the flange, whereby the steam is prevented from escaping through the strainer. Thus it is obvious that the flange F serves the twofold purpose of supporting the vessel and preventing the steam from escaping between the vessel and the kettle. The flange F may be secured to the strainer by one or more clamping or adjusting screws, $a$, adapted to operate in slot $b$, by which said flange may be adjusted nearer to or farther from the top of said perforated vessel, whereby the same may be readily adapted to be used for either a strainer or steamer, as occasion may require.

Having thus described our invention, what we claim as new, and desire to secure by Letters Patent, is—

The combination of vessel A, provided with slot $b$, cover D, handle C, kettle B, flange F, and adjusting-screw $a$, said flange F being adapted to be adjusted nearer to or farther from the top of said vessel, whereby the vessel may be used for either a steamer or for a strainer, as set forth.

In testimony whereof we affix our signatures in presence of two witnesses.

JOHN DORSCH.
GEORGE LINDNER.

Witnesses:
G. EISELEIN,
JOHN HALLEON.